(12) United States Patent
Henry

(10) Patent No.: US 7,794,134 B1
(45) Date of Patent: Sep. 14, 2010

(54) METHOD OF PRECONDITIONER CONTROL WITH REDUCED OR ZERO WASTE

(75) Inventor: William A. Henry, St. Benedict, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 0 days.

(21) Appl. No.: 12/768,301

(22) Filed: Apr. 27, 2010

Related U.S. Application Data

(63) Continuation of application No. 12/711,939, filed on Feb. 24, 2010, now abandoned.

(51) Int. Cl.
*B01F 15/02* (2006.01)

(52) U.S. Cl. .................. 366/138; 366/141; 366/193; 366/290; 366/601; 426/519

(58) Field of Classification Search ............ 366/66, 366/91, 96–99, 141, 192, 193, 290, 291, 366/297–301, 323, 325.2, 601, 138; 99/348, 99/353; 318/4, 5, 8; 388/936; 425/135, 425/143, 148, 140, 145, 146; 426/233, 454, 426/516, 519

See application file for complete search history.

(56) References Cited

U.S. PATENT DOCUMENTS

| | | | | |
|---|---|---|---|---|
| 4,752,139 | A * | 6/1988 | Hauck ................... | 366/298 |
| 5,143,738 | A | 9/1992 | Nordin | |
| 5,161,888 | A * | 11/1992 | Hauck ................... | 366/299 |
| 5,402,352 | A | 3/1995 | Kniepmann et al. | |
| 5,460,448 | A * | 10/1995 | Woolsey ................ | 366/301 |
| 5,783,240 | A | 7/1998 | Wenger et al. | |
| 6,340,487 | B1 * | 1/2002 | Wenger et al. ......... | 426/231 |
| 6,386,748 | B1 | 5/2002 | Huber et al. | |
| 6,432,463 | B1 | 8/2002 | Bhaskar et al. | |
| 6,465,029 | B2 * | 10/2002 | Wenger et al. ......... | 426/231 |
| 6,482,453 | B2 * | 11/2002 | Wenger et al. ......... | 426/231 |
| 6,550,959 | B2 * | 4/2003 | Huber et al. .......... | 366/301 |

(Continued)

FOREIGN PATENT DOCUMENTS

WO    WO 0172150    10/2001

(Continued)

OTHER PUBLICATIONS

*APM Manual*; Wenger Manufacturing, Inc., 1998.

(Continued)

*Primary Examiner*—Charles E Cooley
(74) *Attorney, Agent, or Firm*—Hovey Williams LLP

(57) ABSTRACT

Improved, low- or no-waste control methods for food processing systems including a preconditioner (14) and a downstream processing device such as an extruder (16) are provided. The control methods include both startup and shutdown sequences, and an optional flush sequence. During startup, a gate (64) of preconditioner (14) is initially closed and is thereafter sequentially opened to a full open, normal operating position after predetermined preconditioner temperature and/or weight set points are achieved. Shutdown involves terminating the flow of ingredients to the preconditioner (14) while the gate (64) remains open, with the preconditioner operated to deliver the preconditioned material within the preconditioner (14) to the extruder (16) for as long as possible in order to minimize any residual waste within the preconditioner.

20 Claims, 6 Drawing Sheets

U.S. PATENT DOCUMENTS

| | | | |
|---|---|---|---|
| 6,648,501 B2 * | 11/2003 | Huber et al. | 366/301 |
| 6,773,739 B2 | 8/2004 | Hauck et al. | |
| 6,932,993 B2 | 8/2005 | Stein Von Kamiensky et al. | |
| 7,448,795 B2 * | 11/2008 | Wenger et al. | 366/301 |
| 2001/0036491 A1 * | 11/2001 | Wenger et al. | 425/381.2 |
| 2004/0142081 A1 | 7/2004 | Durand et al. | |
| 2005/0214419 A1 * | 9/2005 | Aberle et al. | 426/233 |
| 2009/0067282 A1 * | 3/2009 | Wenger et al. | 366/300 |
| 2009/0175119 A1 * | 7/2009 | Wenger | 366/132 |

FOREIGN PATENT DOCUMENTS

WO     WO 02069744 A1 *   9/2002

OTHER PUBLICATIONS

*RTC Manual*; Wenger Manufacturing, Inc., date unknown.

*Modeling in Extrusion Cooking of Breakfast Cereals*, Apruzzese, Francesca ; University of Toronto, 1998.

*Two-Stage Preconditioner*, Buhler Pasta & Extruded Products; Buhler AG, CH-2940 Uzwill, Switzerland, date unknown.

* cited by examiner

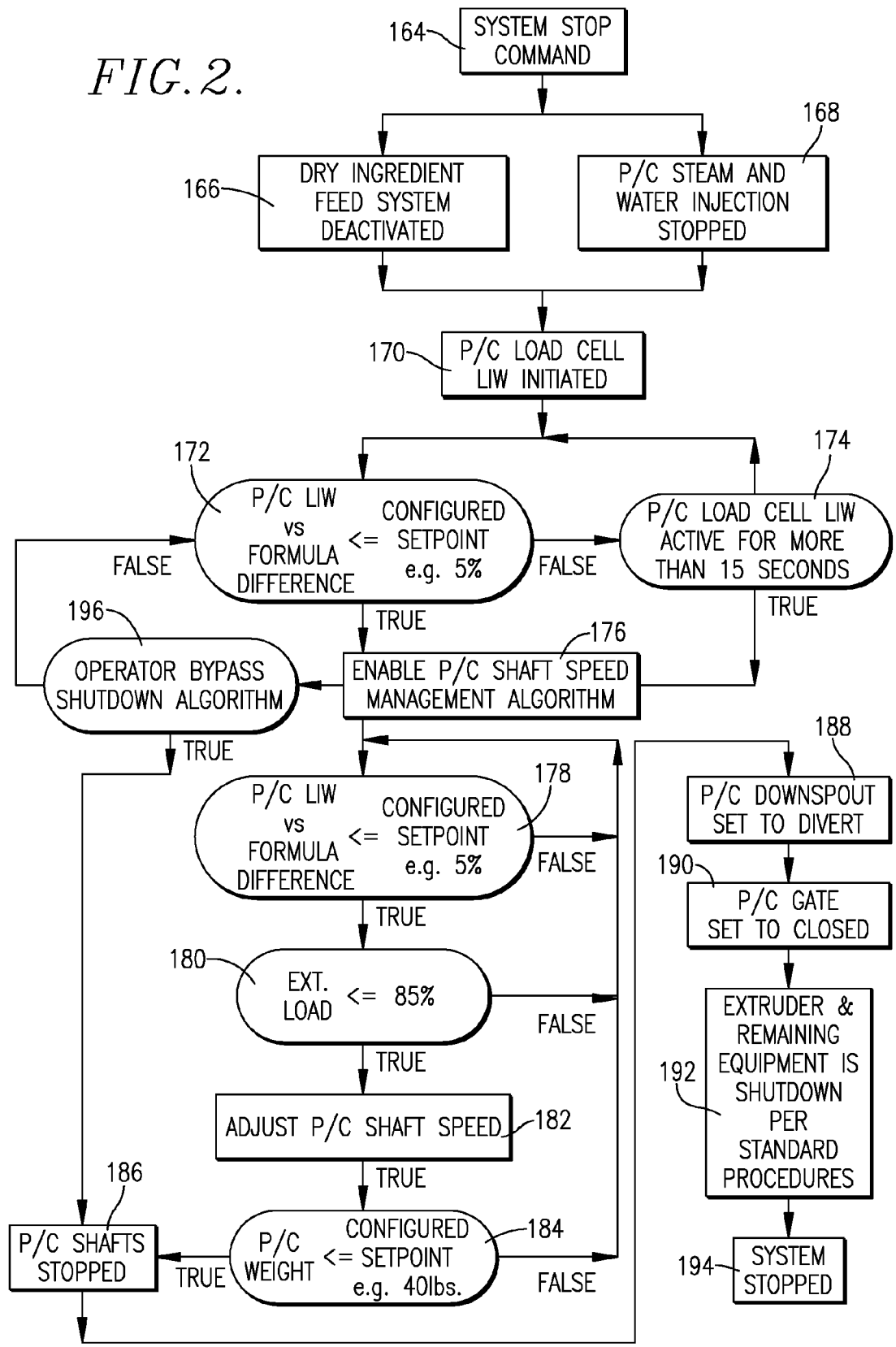

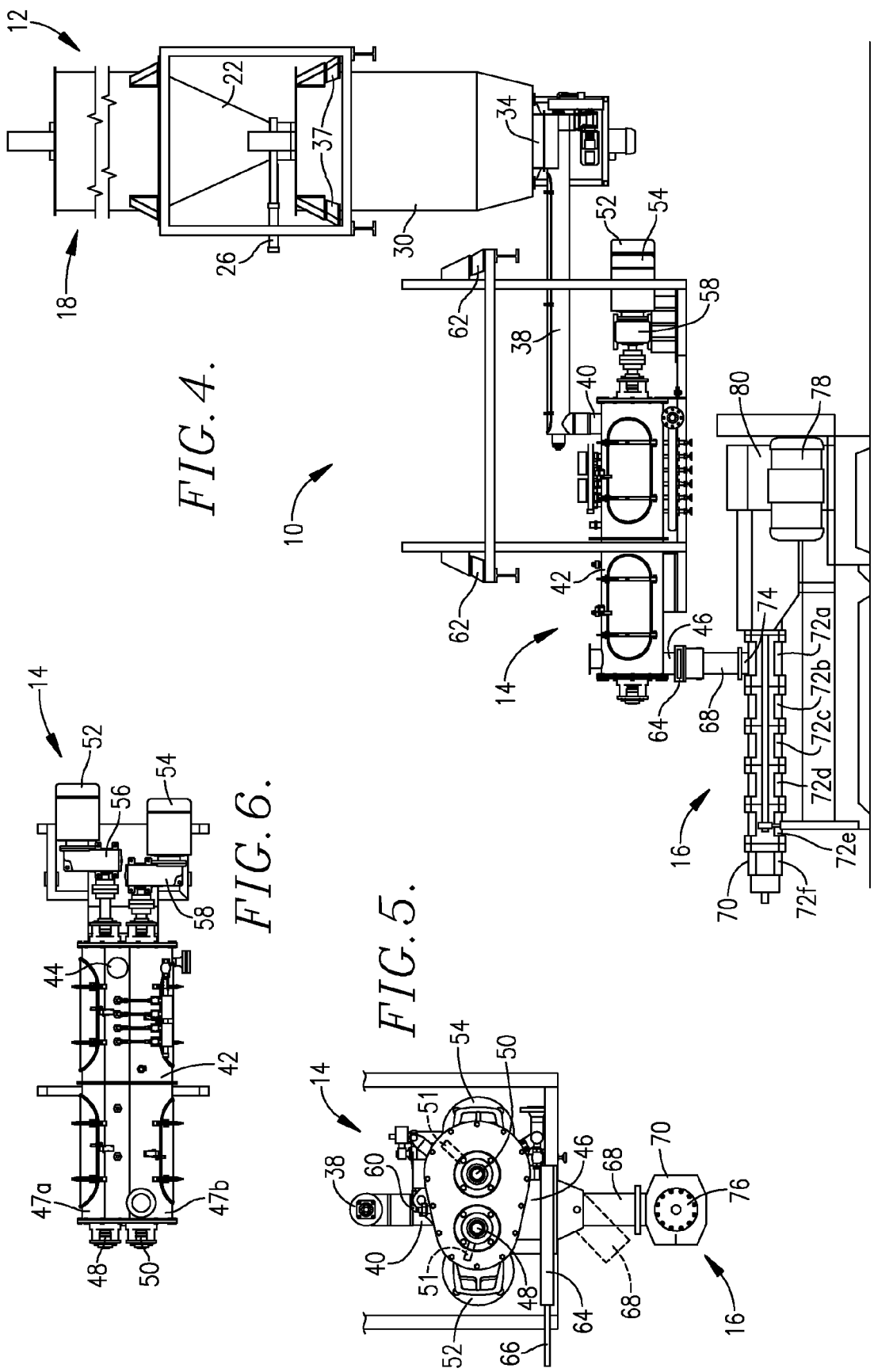

METHOD OF PRECONDITIONER CONTROL WITH REDUCED OR ZERO WASTE

CROSS-REFERENCE TO RELATED APPLICATION

This application is a continuation of U.S. patent application Ser. No. 12/711,939, filed Feb. 24, 2010, now abandoned, which is incorporated herein by reference in its entirety.

BACKGROUND OF THE INVENTION

1. Field of the Invention

The present invention is broadly concerned with improved methods for startup and shutdown of preconditioners and complete food processing systems so as to avoid creation of substantial quantities of waste materials. Preferably, the invention is concerned with such methods, and optional flush methods, which employ software control of the system equipment in order to generate very little, if any, waste products. The invention is especially adapted for use with preconditioner/extruder systems used for the production of human foods and animal feeds.

2. Description of the Prior Art

Conventional food extrusion systems typically include a material feed system, a preconditioner, and an extruder. These are linked in serial order so as to deliver material to the preconditioner where it is moisturized and heated, and normally partially cooked, with the preconditioned material then directed to the extruder for final processing. Startup of such systems requires that the preconditioner and extruder achieve normal operating process conditions in terms of temperature, steam and/or water injection into the preconditioner and sometimes into the extruder, and pressure conditions within the extruder barrel. Normally, startup conditions are different than final processing conditions, and the former are adjusted over time to achieve the final process conditions.

In starting up a preconditioner, it is a common practice to initially divert the output of the preconditioner to waste, rather than passing this material into the extruder barrel. Similarly, when material is fed into the barrel, there is a period of time where unacceptable product is produced at the extrusion die, and this material is likewise considered waste. The average amount of waste material generated during startup of a preconditioner/extruder system depends upon the type of extruder (e.g., single or twin screw) and the process rate. Experience has shown that the waste ranges from about 80-170 kg.

This amount of waste is significant, especially in the production of short-run specialty products. However, the creation of such waste, especially at the preconditioner, can lead to unsanitary plant conditions. The under-processed waste material from the preconditioner is moist and warm, but has not been heated to a sterile condition. Therefore, this waste is subject to microbial contamination and growth, and must be carefully handled lest it serve as a source of contamination in the plant. These factors are to some extent mirrored with extruder waste, but generally the latter is not as troublesome as preconditioner waste.

Present day extrusion systems often are digital processor-controlled through a programmable logic controller (PLC) or other known device. In such systems, a formula including default or inputted values is created by the system operator, in order to control startup, normal running, and shutdown. U.S. Pat. No. 6,465,029 describes a software-based control system which is particularly designed for rapid changeover between extrusion runs, allowing the operator to easily change between formulas and final products without the need to shut down the system.

There is accordingly a real and unsatisfied need in the art for improved methods of system startup and shutdown without generating undue amounts of waste materials.

SUMMARY OF THE INVENTION

The present invention overcomes the problems outlined above and provides an improved method for starting up a preconditioner configured to deliver preconditioned ingredients to a downstream processing device, such as an extruder or pellet mill. The preconditioner includes an elongated housing presenting an inlet and an outlet and at least one (and preferably two) elongated, axially rotatable shaft(s) within the housing between the inlet and the outlet, with a plurality of outwardly extending mixing elements on the shaft(s). A gate is provided adjacent the housing outlet and is movable between a closed position substantially preventing flow of any material from the housing, an open normal process or operating position, and at least one intermediate position between the closed and the open normal process or operating positions.

The preferred startup method includes the steps of moving the preconditioner gate to the closed position thereof, initiating rotation of the preconditioner shaft(s), delivering starting ingredients to the preconditioner housing through the inlet, and adding steam to the starting ingredients within the housing at an initial steam injection rate. At least one parameter of the preconditioner is monitored until a predetermined operating set point is achieved; the parameter is selected from the group consisting of the temperature of the moisturized ingredients within the housing, and the weight of the moisturized ingredients within the housing, or a combination thereof. When the predetermined set point is achieved, the steam injection rate is changed to a normal process or operating steam injection rate, and the gate is moved to an intermediate position in order to deliver preconditioned ingredients to the downstream processing device at an initial delivery rate. Thereafter, the gate is moved to the open operating position thereof to deliver preconditioned ingredients to the processing device at a preconditioner normal process or operating delivery rate.

In preferred practice, both the temperature and weight of the moisturized ingredients within the preconditioner housing are monitored until predetermined temperature and weight set points are achieved.

The preferred startup method also includes monitoring a parameter of the downstream processing device until a downstream process set point is achieved, and moving the preconditioner gate to the open operating position when the downstream process set point is met. In the case of an extruder, it is preferred that the parameter be the operating load experienced by the extruder motor drive assembly, and the downstream process set point is a predetermined load factor.

Advantageously, the preconditioner is a twin shaft preconditioner of the type described in U.S. Pat. No. 7,448,795, which permits individual and infinite adjustment of both the speed and direction of rotation of the shafts. In such instances, the startup method would involve individually controlling these factors to expeditiously reach normal process or operating conditions.

It will be appreciated that closing of the preconditioner gate during at least a part of the startup method prevents creation of substantial quantities of under-processed waste. Indeed, proper selection of the startup set points allows the operator to go from a cold start to full process conditions with no generation of waste whatsoever Once the startup sequence is completed, the process run continues at normal process or operating conditions. When it is desired to shut down the system, the first step is termination of the flow of starting ingredients to the preconditioner housing while maintaining the exit gate in the open normal process or operating position thereof. After such termination is achieved, the rotation of the preconditioner shaft(s) is controlled so as to substantially maintain the normal process or operating delivery rate to the downstream device. The weight of ingredients within the preconditioner housing is monitored during the controlled rotation of the shaft(s) until this weight reaches a predetermined minimum set point weight. The rotation-controlling step comprises the step of using the weight monitoring information to at least in part control the rotation of the shaft(s).

The ability to control the speed and direction of rotation of the preconditioner shaft(s) allows maximum use of the preconditioned material within the preconditioner housing. That is, even though material flow to the preconditioner is terminated, the preconditioner continues to deliver properly processed material to the downstream device at the normal process or operating delivery rate until virtually all of the material within the preconditioner housing is expended. Any residual materials within the preconditioner can be easily removed by an automated flush system or by manual cleaning. The quantity of such residual waste is normally very small, on the order of 10 lbs or less.

BRIEF DESCRIPTION OF THE DRAWINGS

FIG. 2 is a schematic flow diagram illustrating the preferred software-based control for the shutdown of a preconditioner;

FIG. 4 is a side view of an extruder system in accordance with the invention made up of a material feeding system, a preconditioner, and an extruder;

FIG. 5 is a fragmentary front view illustrating the preconditioner and extruder depicted in FIG. 1, and illustrating the diverter between the preconditioner outlet and the inlet of the extruder in respective operational conditions;

FIG. 6 is a plan view of the preconditioner depicted in FIGS. 4 and 5, shown with separate variable speed drives for the preconditioner shafts.

DETAILED DESCRIPTION OF THE PREFERRED EMBODIMENT

The Preferred Extrusion System

Figure 1:
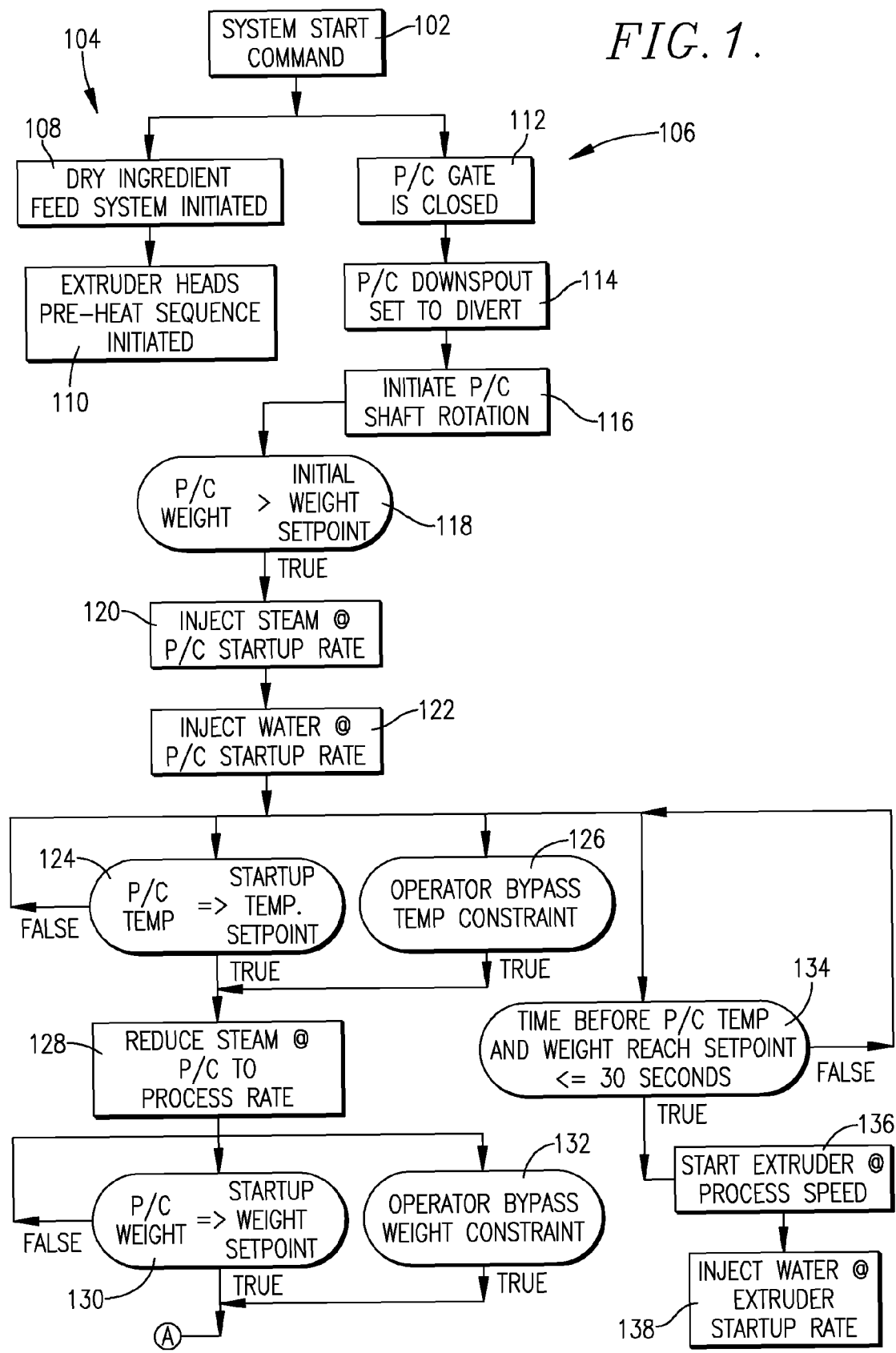
FIGS. 1 and 1A are together a schematic flow diagram illustrating the preferred software-based control for the startup of a preconditioner.

Turning now to the drawings, an overall extruder system 10 is illustrated in FIG. 4 and broadly includes a material feed system 12, preconditioner 14, and extruder 16. As illustrated, the components are in serial order, i.e., the feed system 12 is coupled with preconditioner 14, and the latter is in turn coupled with extruder 16. The system 10 is designed for the production of a variety of human food or animal feed products.

In more detail, the feed system 12 includes a feeder assembly 18 having an uppermost frustoconical inlet bin 22, and a shiftable slide gate 26 at the base of the bin 22. The lower end of the bin 22 communicates via gate 26 with a live-bottom bin 30 having lowermost outlet 34. Load cells 37 are provided for the bin 22, to enable continuous weight monitoring of the bin. The outlet 34 is coupled with an elongated screw feeder 38 leading to preconditioner 14 and terminating with a depending conveying tube 40.

The preconditioner 14 is of the type described in U.S. Pat. No. 7,448,795, the entirety of which is incorporated by reference herein. The preconditioner 14 includes an elongated housing 42 presenting an inlet 44, designed for coupling with tube 40, and an outlet 46. The housing 42 has a pair of elongated, juxtaposed chambers, namely a chamber 47a of relatively small diameter and a chamber 47b of relatively large diameter. The preconditioner also has a pair of shafts 48 and 50 extending along corresponding chambers 47a and 47b. The shafts 48, 50 support a plurality of outwardly extending, intercalated mixing elements or paddles 51, which serve to mix and advance material within the housing. The shafts 48, 50 are independently driven by means of motors 52 and 54 with intermediate variable speed drives 56 and 58. In this way, the individual shafts 48, 50 may be rotated at infinitely variable individual speeds and in the same or different rotational directions. Of course, the intercalated mixing elements are axially offset within housing 42, so as to preclude any interference between the elements during rotation of the shafts 48, 50. The housing 42 is also equipped with conventional injectors 60 permitting injection of steam and/or water into the interior of the housing for mixing with food or feed materials therein. In addition, the housing 42 is supported by an assembly of load cells 62, allowing continuous monitoring of the weight of materials within housing 42. The importance of this feature will be described hereinafter.

The outlet 46 of housing 42 is also equipped with a slide gate assembly 64, including a plate 66 which is movable between a fully closed position across outlet 46 and a fully opened position allowing free flow of material from outlet 46. In addition, the plate 66 may be positioned at any one of a number of intermediate, partially opened positions. Preferably, the movement of plate 66 is governed by a servo motor (not shown). A tubular diverter downspout 68 is pivotally coupled to outlet 46 and is movable by means of a motorized operator (not shown) between a vertical product delivery position, illustrated in full lines in FIG. 5, and a material diversion position, depicted in phantom.

The extruder 16 is a conventional single-screw extruder including an elongated barrel 70 made up of a plurality (here six) of tubular interconnected heads 72a-72f presenting an inlet 74 beneath diverter 46, and a restricted orifice die assembly 76 at the opposite end of the barrel. The barrel 70 is also equipped with injectors (not shown) for selectively injecting steam and/or water into the barrel along the length thereof, and the heads 72b-72e downstream of inlet 74 have external jackets for indirect heating of the heads with heat exchange media (e.g., hot oil or water). An elongated, axially rotatable, helically flighted screw (not shown) is located within extruder barrel 70 and serves to move material from inlet 74, along the length of barrel 70, and through die assembly 76. In order to achieve desired degrees of cook, the material is normally subjected to increasing levels of temperature, pressure, and shear along barrel 70 and through die assembly 76. The internal screw is driven by means of electrical motor 78 and gear reducer assembly 80, which experience a load during operation thereof.

In the general operation of system 10, incoming food or feed ingredients are delivered to the bin 30 and are fed at a predetermined rate and proportion through screw feeder 38 in order to convey the materials into the inlet 44 of preconditioner housing 42. Within the preconditioner, the material is moisturized and heated by injection of steam and/or water, and the rotation of the mixing shafts 48 and 50. After suitable preconditioning, the material is fed through outlet 46 and downspout 68 into the inlet 74 of extruder barrel 70. Such material is then processed within the extruder and is ultimately extruded through die assembly 76 as a cooked and formed end product. In many cases, the product may be severed at the outlet of die assembly 76 by means of a rotating knife assembly (not shown), and is normally dried and cooled.

The Preferred System Startup

As noted previously, a significant problem in the extrusion art is the creation of substantial quantities of waste materials, both at the startup of an extrusion system, and during shutdown thereof. However, the present invention largely eliminates these problems and provides a control system which creates zero or near-zero waste. This control system is resident as software on a conventional digital processor, such as a PLC or computer. Appropriate sensors, drives, and electrical leads, as required for digital process control, are also provided and are operably connected with the digital processor to permit continuous monitoring of various aspects of the extruder system, and execution of control commands based, in part, upon such monitoring.

A prime goal of the startup procedure is to essentially eliminate the production of waste, especially from the preconditioner 14. In general, this is achieved by moving the gate 64 to its fully closed position, initiating rotation of the shafts 48 and 50, delivering staring ingredients via material feed system 12, and adding steam (and sometimes water) to the preconditioner at an initial steam injection rate. At least one parameter of the preconditioner is to monitored until a predetermined set point is achieved, whereupon the steam injection rate is changed to a final process steam injection rate. Such a parameter may be selected from the group consisting of the temperature of the moisturized ingredients within the preconditioner housing 42, the weight of such ingredients, or a combination thereof. In any event, when the final process steam injection rate is commenced, the gate 64 is moved to an intermediate position to deliver preconditioned ingredients to a downstream processing device at an initial delivery rate. After a suitable period, the gate is then moved to its full open normal process or operating position and the preconditioner is thus fully operational for the extruder run at a preconditioner process delivery rate. The extruder is then operated at a process extrusion rate consistent with the preconditioner process delivery rate, and this is continued for a period of time while the preconditioner shaft rotation is controlled. In preferred practice, this startup occurs with no creation of waste from the preconditioner, but in any case the waste is very minimal.

Preferably, initiation of heating of the extruder barrel occurs at or about the time when the ingredients are first delivered to the preconditioner housing. This typically involves the addition of steam and/or water to the extruder barrel at initial rate(s) during the time when the preconditioned ingredients are delivered to the extruder barrel at the initial delivery rate. In like manner, steam and/or water are added to the extruder barrel at operating process rate(s) when the preconditioned ingredients are delivered to the extruder barrel at process delivery rate(s).

Figure 1A:
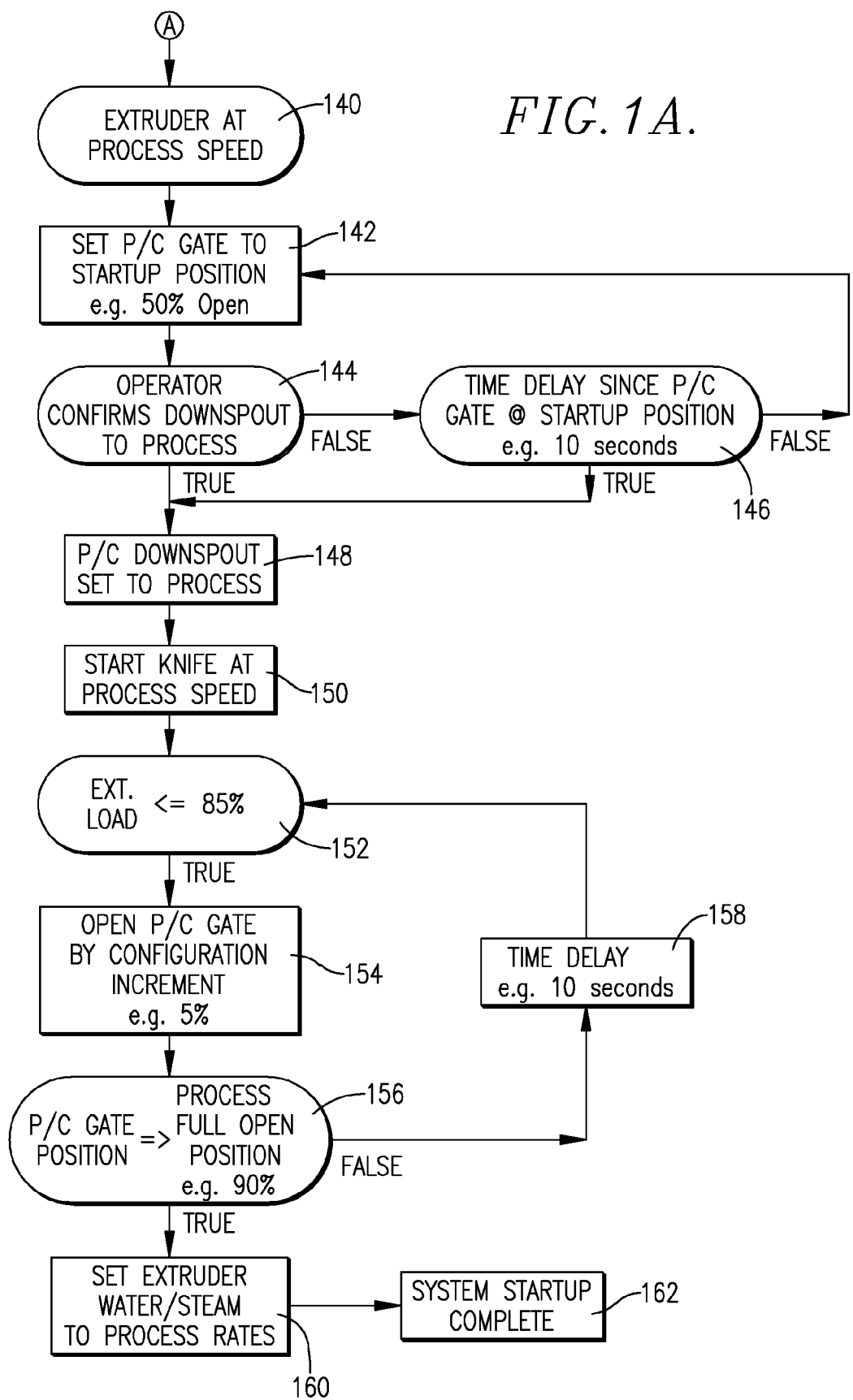

Turning now to FIGS. 1 and 1A, a startup control system 100 is illustrated, which is useful the extruder system 10 and analogous equipment. In this discussion, it will be assumed that the preconditioner 14 and extruder 16 are "cold" and have not been recently used, and it is desired to produce an extruded food or feed product from a cold start.

Furthermore, before any startup sequence is commenced, the operator must establish system parameters for the extrusion run, commonly referred to as a "Formula." This is done by either accepting default parameters resident in the digital processor, or inputting other selected values, which in either case will govern the operation of the system. Some of these parameters are initial or startup values used only during the startup phase of operation, with corresponding normal process or operating position values used after the startup sequence is completed and throughout the run until shutdown is desired. The shutdown sequence also has default or inputted shutdown values.

In more detail, in the preferred embodiment of the invention, the Formula would include the following default or manually inputted, operator-chosen values, which may be dependent upon the makeup of the materials being processed, the desired degree of cook and expansion in the final extrudate, and other factors known to those skilled in the art:

Formula

Startup/Shutdown Values
1 Raw Material Feed Rate Process Set Point (lbs/hr)
2 Bulk Density of Raw Material Recipe (lbs/ft$^3$)
3 Preconditioner Steam Injection (% of Value #1)
4 Preconditioner Water Injection (% of Value #1)
5 Preconditioner Liquid 1 Injection (% of Value #1)
6 Preconditioner Liquid 2 Injection (% of Value #1)
7 Preconditioner Liquid 3 Injection (% of Value #1)
8 Extruder Steam Injection (% of Value #1)
9 Extruder Water Injection (% of Value #1)
10 Extruder Zone 1 Temperature Set Point (° F.)
11 Extruder Zone 2 Temperature Set Point (° F.)
12 Extruder Zone 3 Temperature Set Point (° F.)
13 Extruder Zone 4 Temperature Set Point (° F.)
14 Extruder Zone 5 Temperature Set Point (° F.)
15 Extruder Screw Speed Set Point (rpm)
16 Cutoff Knife Speed Set Point (rpm)
17 Startup Feed Rate (% of Value #1)
18 Feed Rate Alarm Offset (% of Value #1)
19 Feeder Screw Refill Composition (%)
20 Preconditioner Steam Injection Alarm Offset (% of Value #3 above)
21 Preconditioner Water Injection Alarm Offset (% of Value #4 above)
22 Preconditioner Liquid 1 Injection Alarm Offset (% of Value #5 above)
23 Preconditioner Liquid 2 Injection Alarm Offset (% of Value #6 above)
24 Preconditioner Liquid 3 Injection Alarm Offset (% of Value #7 above)
25 Extruder Steam Injection Alarm Offset (% of Value #8 above)
26 Extruder Water Injection Alarm Offset (% of Value #9 above)
27 Extruder Startup Extra Water (% of Value #1)
28 Extruder Zone Temperatures Alarm Offset (% of Values 10-14 above)

29 Maximum Extruder Motor Load Set Point (%)
30 Maximum Pressure Set Point at Die (psi)
31 Live Bottom Bin(s) Low Level (%)
32 Live Bottom Bin(s) High Level (%)
33 Startup Preconditioner Outlet Gate Position (% open)
34 Process Preconditioner Outlet Gate Position (% open)
35 Open Interval Time of Preconditioner Outlet Gate (seconds)
36 Incremental Opening of Preconditioner Outlet Gate (% open)
37 Preconditioner Maximum Weight (lbs)
38 Preconditioner Startup Weight (lbs)
39 Preconditioner Empty Weight (lbs)
40 Preconditioner Startup Temperature (° F.)
41 Preconditioner Large Shaft Speed (rpm)
42 Preconditioner Large Shaft Rotation Direction (clockwise/counterclockwise)
43 Preconditioner Small Shaft Speed (rpm)
44 Preconditioner Small Shaft Rotation Direction (clockwise/counterclockwise)
Optional Flush Values
45 Preconditioner Shaft Speeds for Flush Cycle (rpm)
46 Preconditioner Steam Set Point for Flush Cycle (lbs/hr)
47 Preconditioner Water Set Point for Flush Cycle (lbs/hr)
48 Preconditioner Temperature Set Point for Flush Cycle (° F.)
49 Preconditioner Weight Set Point for Flush Cycle (lbs)
50 Preconditioner Dwell Time for Flush Cycle (minutes)

It will be appreciated that certain of the above values are designed for control in the event of system upsets, specifically Formula values nos. 20-26. Also, the values respecting preconditioner liquids 1-3 (values nos. 5-7) refer to extruder runs having additional preconditioner injections apart from steam and water. Finally, the extruder zone temperature set points (values nos. 10-14) refer to indirect temperature control of the extruder heads.

Figure 7:
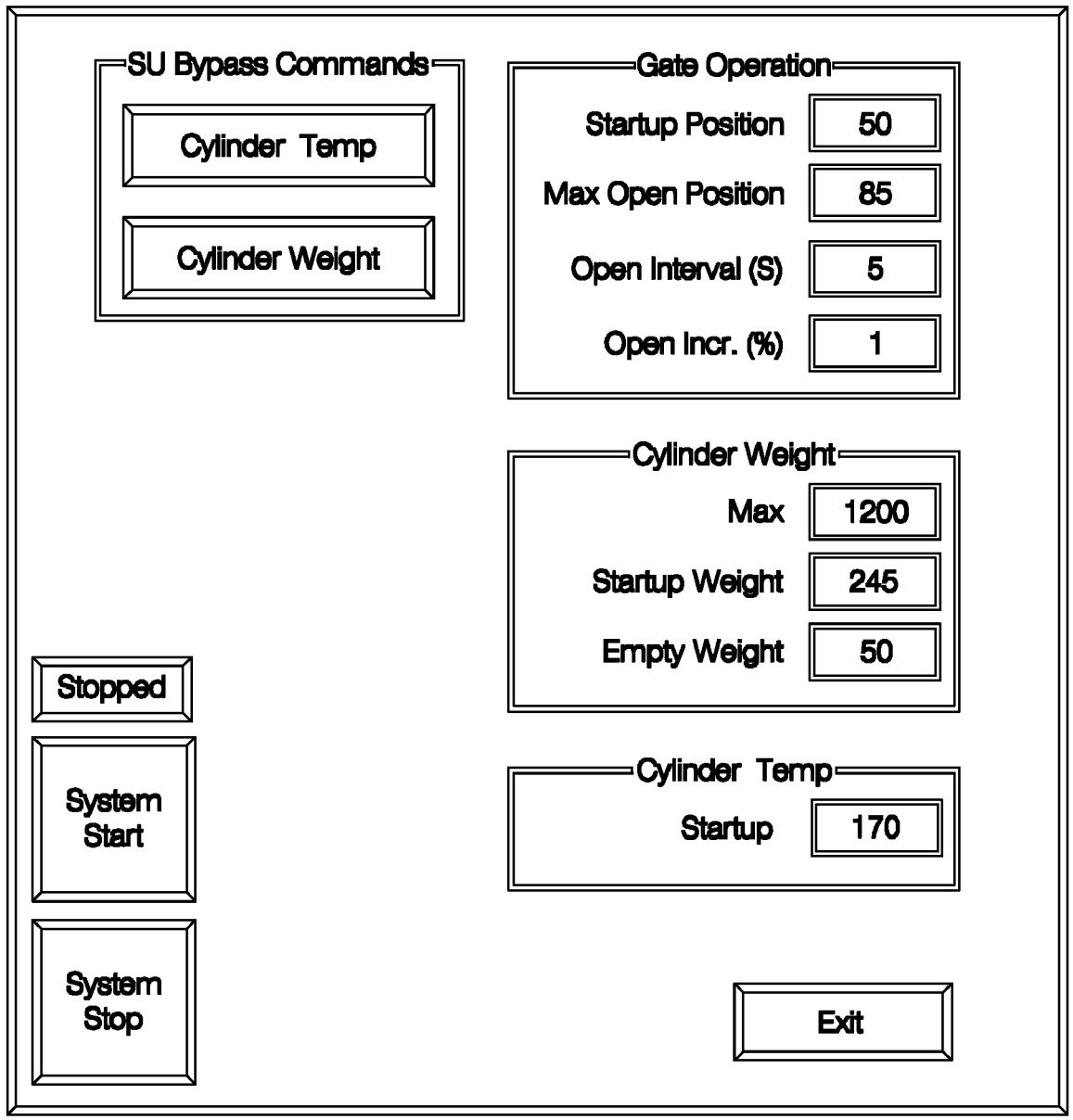
FIG. 7 is a snapshot view of the software control screen used in the startup and operation of the preferred software control methods of the invention.

FIG. 7 is a snapshot view of the preferred control screen used in the startup and operation of a preconditioner. As illustrated, the "Gate Operation" box includes a gate startup position, a maximum gate open position, an open interval, and open increments; these correspond to the above Formula inputs nos. 33-36, respectively. In practice, the startup position is initially set after the temperature and weight constraints have been met during startup. The maximum open position limits the range of operation of the gate during startup and normal operation. The open interval is a built-in waiting period between changes in the gate position. The open increment is the selected position change increment in the gate position made by the program when the conditions are met.

The "Cylinder Weight" box includes maximum cylinder weight, startup weight, and empty weight inputs, corresponding to the above Formula inputs nos. 37-39, respectively. The maximum cylinder weight is the maximum allowable weight in the preconditioner during startup or operation. The startup weight is the weight constraint that must be met prior to initiating operation of the extruder. The empty weight is the weight constraint that initiates shutdown of the preconditioner shafts during the optional clean-out shutdown.

The "Cylinder Temperature" box is the temperature constraint that must be met prior to initiating operation of the extruder, and corresponds to the above Formula input no. 40. The "SU Bypass Commands" box allows the operator to force the program to ignore the pre-set constraints for temperature and/or weight and will allow the extruder to commence operation.

Finally, the "System Start," "System Stop," and "Stopped" boxes permit initiation of the software control, stopping of the software control, and intermediate stopping, respectively. The first to boxes correspond to the above Formula inputs 102 and 164, and the latter box allows interruption of the program at any point.

It will be understood that the remaining Formula inputs are typically preset for a given system and are used in the production of a variety of different products. Of course, the control software also allows changing any one of the other inputs for specialized situations, or during the course of operation, e.g., alteration of preconditioner shaft speed or direction.

Figure 3:
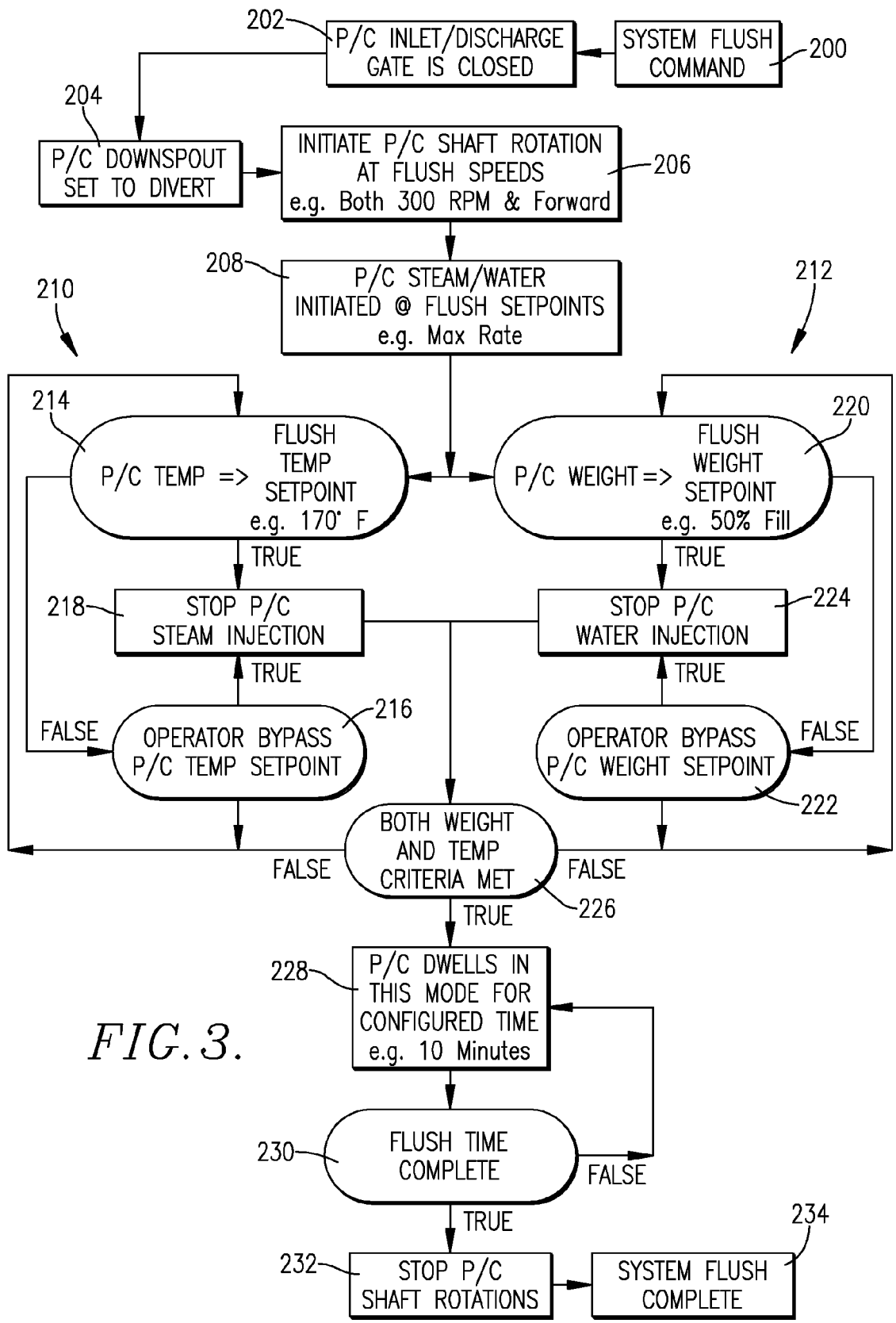
FIG. 3 is a schematic flow diagram illustrating the optional, software-based control preconditioner flush and clean-out sequence.

With the foregoing general explanations in mind, attention is directed to FIGS. 1-3. In the first step, a start command 102 is issued by the operator. This initiates two sequences 104 and 106. The sequence 104 initiates operation of the feed system 12 (step 108) at the startup feed rate (Formula value 17) so as to begin transfer of materials from the bins 30 to preconditioner 14 via feeder 38. Also, heating of the heads 72 by passage of heat exchange media through the jackets of the heads 72b-72e is commenced (step 110).

The sequence 106 is designed to control the startup of preconditioner 14 and extruder 16. In the first step 112, the gate assembly 64 is operated to move plate 66 to its fully closed position, preventing flow of material from preconditioner 14. Also, the downspout 68 is shifted to its diversion position, illustrated in phantom in FIG. 5 (step 114). The preconditioner shafts 48 and 50 are also actuated via the motors 52, 54 and drives 56, 58 in order to rotate the shafts (step 116). As material enters the preconditioner from feeder 38 and delivery tube 40, the weight of the preconditioner increases. The load cell assembly 62 monitors this increasing weight until a predetermined initial weight set point is reached (step 118). When this weight set point is achieved (the "True" condition), steam and/or water are injected into the housing 42 (steps 120 and 122) at respective preconditioner startup rates normally greater than the normal process or operating rates.

Also, the temperature of the materials within housing 42 are continuously monitored until a startup temperature set point is reached (step 124). During this monitoring prior to reaching the set point (the "False" condition), the operator may bypass this temperature step in optional step 126 (the "True" condition). In normal operation, the monitoring of step 124 is continued until the set point temperature is reached. In either case, i.e., with operator bypass or when the set point temperature is reached (the "True" condition), steam flow to the preconditioner is reduced to a predetermined normal operating or process rate (step 128).

A similar process loop is provided for the preconditioner in order to reach a startup weight set point (step 130). During the buildup of preconditioner weight, the operator may bypass the weight constraint with optional step 132. As before, if the operator bypass step is initiated or the startup weight set point is reached (the "True" condition), the process continues to the next step (FIG. 1A).

However, while the preconditioner startup temperature set point and startup weight set point process loops are in progress, a timing step 134 is carried out. This is a predictive step based upon the rate of progress towards the startup temperature and weight set points and is continuously carried out (the "False" condition) until the system predicts that 30 seconds will elapse before the preconditioner startup temperature and weight set points are reached (the "True" condition). At this point, the extruder screw begins operating at its normal process or operating rotational speed (step 136) and water is injected into the extruder at a relatively low startup rate (step 138).

The "True" condition of step 130 occurs after the steps 136 and 138, and serves to increase the extruder screw rotational speed to a normal process or operating speed (step 140). Also, the preconditioner slide gate 64 is opened to a startup position, typically less than full open and usually from about 20-70% open (step 142). At this point, operator intervention is needed to confirm that the downspout 68 is in its lowered position, shown in full lines in FIG. 5, by inputting a continue command (step 144). If the operator perceives that the downspout is not in its process state (the "False" condition), a time delay (step 146, typically ranging from about 0.5-15 seconds) is initiated to insure that the preconditioner slide gate 64 has been in its startup position for a predetermined period. If this period has not yet elapsed (the "False" condition), the time delay continues until the delay is over (the "True" condition). With the downspout 68 set to its lowered process state (step 148), the rotating cutoff knife assembly associated with the die 76 of extruder 16 is started to run at the cutoff knife at its normal process or operating speed (step 150).

At this point, the load experienced by extruder motor 78 is monitored (step 152) until the load is at a predetermined maximum, such as 85%, and typically ranging from about 50-90%. When this is achieved (the "True" condition), the preconditioner slide gate 64 is incrementally opened at a predetermined rate (step 154, typically from about 0.5-10%) until the gate is in its full open normal process or operating position, such as 90% open (step 156). During monitoring of the gate position and prior to reaching the process full open position (the "False" condition), a predetermined time delay is established (step 158) to allow the extruder load to reach the predetermined maximum. When the gate 64 is in its full open normal process or operating position (the "True" condition), the extruder water/steam injectors are set to their respective process rates (step 160). At this point, (step 162), the entire extruder system 10 is fully started up and is running at normal process or operating conditions.

The extruder system 10 would then be operated for a period of time to complete the extruder run, during which all normal process or operating values are maintained. This may be a period of hours or even days. At some point, however, it will be necessary to shut down the system 10. The shutdown sequence is illustrated in FIG. 2.

The Preferred System Shutdown

Typically, an industrial-sized preconditioner would contain several hundred pounds of material when the shutdown is desired. The aim of the system shutdown of the invention is to permit usage of a very high percentage of the preconditioner material by ensuring that such material is delivered in a fully preconditioned state at the normal process or operational output rate of the preconditioner. In this fashion, this otherwise waste material is passed through the downstream extruder and is processed in the normal manner to yield acceptable end product.

The shutdown sequence involves the operator inputting a stop command (step 164). This is followed by deactivation of the dry ingredient feed system 12 (step 166) and stoppage of preconditioner steam and water injection (step 168). Thereupon, the preconditioner load cell assembly 62 is monitored (step 170) using a loss in weight (LIW) algorithm. The goal is to dynamically monitor the decreasing weight of the preconditioner 14 and to individually control and modulate the rotational speed of the shafts 48, 50 and/or the direction of rotation thereof in order to substantially maintain the normal process or operating delivery rate from the preconditioner for as long as possible.

In particular, the monitoring step 172 involves continuously determining the preconditioner LIW and comparing this with the formula operational output rate for the preconditioner, to determine a difference. If this difference is above a difference set point (e.g., 5% or less), a "False" condition exists and monitoring continues for up to a predetermined period (step 174). After this predetermined period, or if the difference is at or below the difference set point, a "True" condition obtains and a processor-resident preconditioner shaft speed algorithm is initiated (step 176). This algorithm operates to adjust the speeds and/or direction of rotation of shafts 48 and 50 so as to maintain the preconditioner normal process or operating output rate. The algorithm involves a continued determination of the difference between the preconditioner LIW and the formula preconditioner output rate (step 178). If this difference is above the difference set point (the "False" condition), the difference determination repeats. Once the difference is at or below the difference set point (the "True" condition), the extruder load is monitored (step 180). If the load is less than a predetermined maximum load factor (the "False" condition), the monitoring continues until this load factor is achieved (the "True" condition). At this point, the preconditioner shaft speeds are adjusted (step 182) to maintain the preconditioner normal process or operating output rate (the "True" condition) until the weight of the preconditioner determined from the load cell assembly 62 reaches a minimum weight set point (step 184). When this weight is established (the "True" condition), the rotation of shafts 48 and 50 is terminated (step 186). The downspout 68 is then shifted to the diversion position, illustrated in phantom in FIG. 5 (step 188), the gate 64 is closed (step 190), and the remainder of the system 10 is shutdown in accordance with normal operating procedures (step 192). This results in a full stoppage of system 10 (step 194).

The shutdown sequence also allows the operator to bypass the preconditioner shaft speed management algorithm. This involves an operator input (step 196) which immediately initiates steps 186-192 to achieve the full stop condition of step 194.

Optional Steam Flush

When the system 10 is fully stopped, it may be restarted for production of another type of product. In such a case, there is usually no need to flush the preconditioner 14 or clean out extruder 16, because the minor amounts of material left from the preceding run will be expelled from the system during the early startup phase of the next run. However, if it is desired to stop extrusion operations all together, it may be desired to flush the preconditioner 14. Clean-out of the extruder 16 is normally a manual operation requiring breakdown of the barrel 70.

Referring to FIG. 3, the preconditioner flush sequence is initiated by an operator system flush command (step 200), which serves to close preconditioner discharge gate 64 (step 202). Next, the downspout 68 is set to the divert position (step 204), steam and water are injected into the preconditioner housing, and the preconditioner shafts 48 and 50 are rotated at flush speeds (step 206). The preconditioner steam and water inputs are initiated at flush set points, which are typically the maximum rates (step 208).

In the next sequence, temperature and weight conditions within preconditioner 14 are monitored and adjusted to meet set point criteria through process loops 210 and 212. In loop 210, the temperature within preconditioner 14 is monitored until a set point is reached (step 214). Optionally, the operator may bypass this process loop by inputting a command (step 216). If the process loop is allowed to continue, a set point temperature is reached (the "True" condition) and steam injection to the preconditioner is terminated (step 218); this same result obtains by the optional bypass input command of step 216. The loop 212 is similar, and involves monitoring the weight of the preconditioner 14 via load cell assembly 62 (step 220) until a predetermined flush weight set point is achieved. Again, the operator may bypass this process loop by an input (step 222). If allowed to continue, the preconditioner weight eventually reaches the set point (the "True" condition) and water injection to the preconditioner is terminated (step 224). Again, this same result is obtained through the optional bypass input command of step 222. Once the steam and water injections to the preconditioner have been terminated through steps 218 and 224, a comparison is made to determine if both the weight and temperature set points have been met (step 226). If this is not the case (the "False" conditions), the process loops 210 and 212 are continued. Once the weight and temperature set points have been met (the "True" condition), the preconditioner dwells in this mode with the shafts rotated at a set point flush rate for a predetermined flush time (step 228). This time is monitored (step 230) and, if the time has not elapsed (the "False" condition), the dwell time continues. Once the time has elapsed (the "True" condition), the rotation of shafts 48 and 50 is terminated (step 232) and gate 64 is opened to complete the flush (step 234).

I claim:

1. A method of starting up a preconditioner including an elongated housing presenting an inlet and an outlet, at least one elongated, axially rotatable shaft within said housing between said inlet and said outlet with a plurality of outwardly extending mixing elements on the shaft, a gate adjacent said outlet and movable between a closed position substantially preventing flow of material from the housing, an open operating position permitting flow of material from the housing, and at least one intermediate position between the closed and open operating positions, said outlet configured to deliver preconditioned ingredients to a downstream processing device, said startup method comprising the steps of:
moving said gate to said closed position;
initiating rotation of said shaft, delivering starting ingredients to said housing through said inlet, and adding steam to said starting ingredients at an initial steam injection rate;
monitoring at least one parameter of the preconditioner until a corresponding predetermined operating set point is achieved, said parameter selected from the group consisting of the temperature of the moisturized ingredients within said housing, and the weight of the moisturized ingredients within said housing, or a combination thereof;
when said predetermined set point is achieved, changing said steam injection rate to a process steam injection rate, and moving said gate to an intermediate position in order to deliver preconditioned ingredients to the processing device at an initial delivery rate; and
thereafter moving said gate to said open operating position in order to deliver preconditioned ingredients to the processing device at a preconditioner process delivery rate.

2. The method of claim 1, including the steps of monitoring both the temperature of the moisturized ingredients within the housing, and the weight of moisturized ingredients within the housing, and continuing said monitoring steps until a predetermined operating set point temperature and predetermined operating set point weight are achieved.

3. The method of claim 1, including the step of monitoring a parameter of said downstream processing device until a downstream device process set point is achieved, and opening said gate to said open operating position when said process set point is achieved.

4. The method of claim 3, said device comprising an extruder having an extruder barrel with an inlet and a restricted orifice die outlet, at least one elongated, axially rotatable, helically flighted screw within said barrel and operable to move preconditioned ingredients from said inlet toward and through said outlet, and a motor drive assembly operably coupled with said screw, said parameter being the operating load experienced by said motor drive assembly during operation of the extruder, said process set point being a predetermined load factor.

5. The method of claim 4, including the step of initiating heating of said extruder barrel at or about the time when said ingredients are first delivered to said housing.

6. The method of claim 4, including the step of adding steam and/or water to said extruder barrel at initial rate(s) during the time when said preconditioned ingredients are delivered to the extruder barrel at said initial delivery rate.

7. The method of claim 6, including the step of adding steam and/or water to the extruder barrel at operating process rate(s) when said preconditioned ingredients are delivered to the extruder barrel at said process delivery rate.

8. The method of claim 1, said preconditioner including a pair of elongated, axially rotatable shafts within said housing, each of said shafts having a plurality of outwardly extending mixing elements thereon, with the elements of the respective shafts being intercalated and axially offset so as to prevent engagement between the elements during rotation of the shafts.

9. The method of claim 8, including the step of individually controlling the rotational speed and direction of rotation of said shafts.

10. A method of shutting down a preconditioner including an elongated housing presenting an inlet and an outlet, at least one elongated, axially rotatable shaft within said housing between said inlet and said outlet with a plurality of outwardly extending mixing elements on the shaft, a gate adjacent said outlet and movable between a closed position substantially preventing flow of material from the housing, an open operating position, and at least one intermediate position between the closed and open operating positions, said outlet configured to deliver preconditioned ingredients to a downstream processing device, said precondtioner housing receiving a flow of starting ingredients to be processed through said inlet, and delivering preconditioned ingredients to said downstream processing device through said outlet at a process delivery rate with said gate open, said shutdown method comprising the steps of:
terminating the flow of said starting ingredients to said housing while maintaining said gate in the open operating position thereof;
after said termination of flow of starting ingredients, controlling the rotation of said shaft so as to substantially maintain said process delivery rate to said downstream processing device; and
monitoring the weight of said ingredients within said housing during said controlled rotation of said shaft until said weight reaches a predetermined minimum set point weight,
said rotation-controlling step comprising the step of using said weight monitoring information to at least in part control the rotation of said shaft.

11. The method of claim 10, including the steps of moving said gate to said closed position and terminating the rotation of said shaft when said minimum set point weight is achieved.

12. The method of claim 10, said device comprising an extruder having an extruder barrel with an inlet and a restricted orifice die outlet, at least one elongated, axially rotatable, helically flighted screw within said barrel and operable to move preconditioned ingredients from said inlet toward and through said outlet, and a motor drive assembly operably coupled with said screw, said extruder operating at a process extrusion rate consistent with said preconditioner process delivery rate, said method including the step of continuing the operation of said extruder at said process extrusion rate for a period of time during said controlling of said shaft rotation.

13. The method of claim 10, said preconditioner including a pair of elongated, axially rotatable shafts within said housing, each of said shafts having a plurality of outwardly extending mixing elements thereon, with the elements of the respective shafts being interpolated and axially offset so as to prevent engagement between the elements during rotation of the shafts, said rotation-controlling step comprising the steps of individually controlling the rotational speed and direction of rotation of said shafts in order to substantially maintain said process delivery rate.

14. A method of operating an extrusion system including:
an elongated housing presenting an inlet and an outlet, at least one elongated, axially rotatable shaft within said housing between said inlet and said outlet with a plurality of outwardly extending mixing elements on the shaft, a gate adjacent said outlet and movable between a closed position substantially preventing flow of material from the housing, an open position permitting flow of material from the housing, and at least one intermediate position between the closed and open positions,
an extruder having an extruder barrel with an inlet and a restricted orifice die outlet, at least one elongated, axially rotatable, helically flighted screw within said barrel and operable to move preconditioned ingredients from said inlet toward and through said outlet, and a motor drive assembly operably coupled with said screw, motor drive assembly experiencing a load during operation thereof,
said housing outlet oriented to deliver material to said barrel inlet,
said operating method comprising the steps of:
starting up said extrusion system using steps comprising—
moving said gate to said closed position;
initiating rotation of said shaft, delivering starting ingredients to said housing through said inlet, and adding steam to said starting ingredients at an initial steam injection rate;
monitoring at least one parameter of the preconditioner until a corresponding predetermined operating set point is achieved, said parameter selected from the group consisting of the temperature of the moisturized ingredients within said housing, and the weight of the moisturized ingredients within said housing, or a combination thereof;
when said predetermined set point is achieved, changing said steam injection rate to a process steam injection rate, and moving said gate to an intermediate position in order to deliver preconditioned ingredients to the processing device at an initial delivery rate; and
thereafter moving said gate to said open operating position in order to deliver preconditioned ingredients to said extruder at a preconditioner process delivery rate;
running said extrusion system for a process period of time at said preconditioner process delivery rate and at an extrusion process rate consistent with said preconditioner process delivery rate, in order to produce acceptable extrudate;
after said process period of time, shutting down said extrusion system using steps comprising—
terminating the flow of said starting ingredients to said housing while maintaining said gate in the open operating position thereof;
after said termination of flow of starting ingredients, controlling the rotation of said shaft so as to substantially maintain said process delivery rate to said downstream processing device; and
monitoring the weight of said ingredients within said housing during said controlled rotation of said shaft until said weight reaches a predetermined minimum set point weight,
said rotation-controlling step comprising the step of using said weight monitoring information to at least in part control the rotation of said shaft.

15. The method of claim 14, including the steps of monitoring both the temperature of the moisturized ingredients within the housing, and the weight of moisturized ingredients within the housing, and continuing said monitoring steps until a predetermined operating set point temperature and predetermined operating set point weight are achieved.

16. The method of claim 14, said startup steps including the step of monitoring a parameter of said extruder until an extruder process set point is achieved, and opening said gate to said open operating position when said extruder process set point is achieved.

17. The method of claim 16, said parameter being the load experienced by said motor drive assembly during operation of the extruder, said process set point being a predetermined load factor.

18. The method of claim 14, said startup steps including the step of initiating heating of said extruder barrel at or about the time when said ingredients are first delivered to said housing.

19. The method of claim 14, said shutdown steps including the step of moving said gate to said closed position and terminating the rotation of said shaft when said minimum set point weight is achieved.

20. The method of claim 14, including the steps of flushing said preconditioner after said shutdown is complete, said flushing step comprising the steps of:
closing said preconditioner gate;
injecting steam and water into said preconditioner housing;
rotating said preconditioner shaft at a flush rate;
monitoring the temperature and weight of said preconditioner until predetermined flush temperature and flush weight set points are reached, and thereafter rotating said shaft at set point flush rate for a predetermined time; and
stopping the rotation of said shaft.

* * * * *